April 22, 1952 T. H. RINER 2,594,264
FISH LURE AND METHOD OF CONSTRUCTING SAME
Filed March 7, 1946
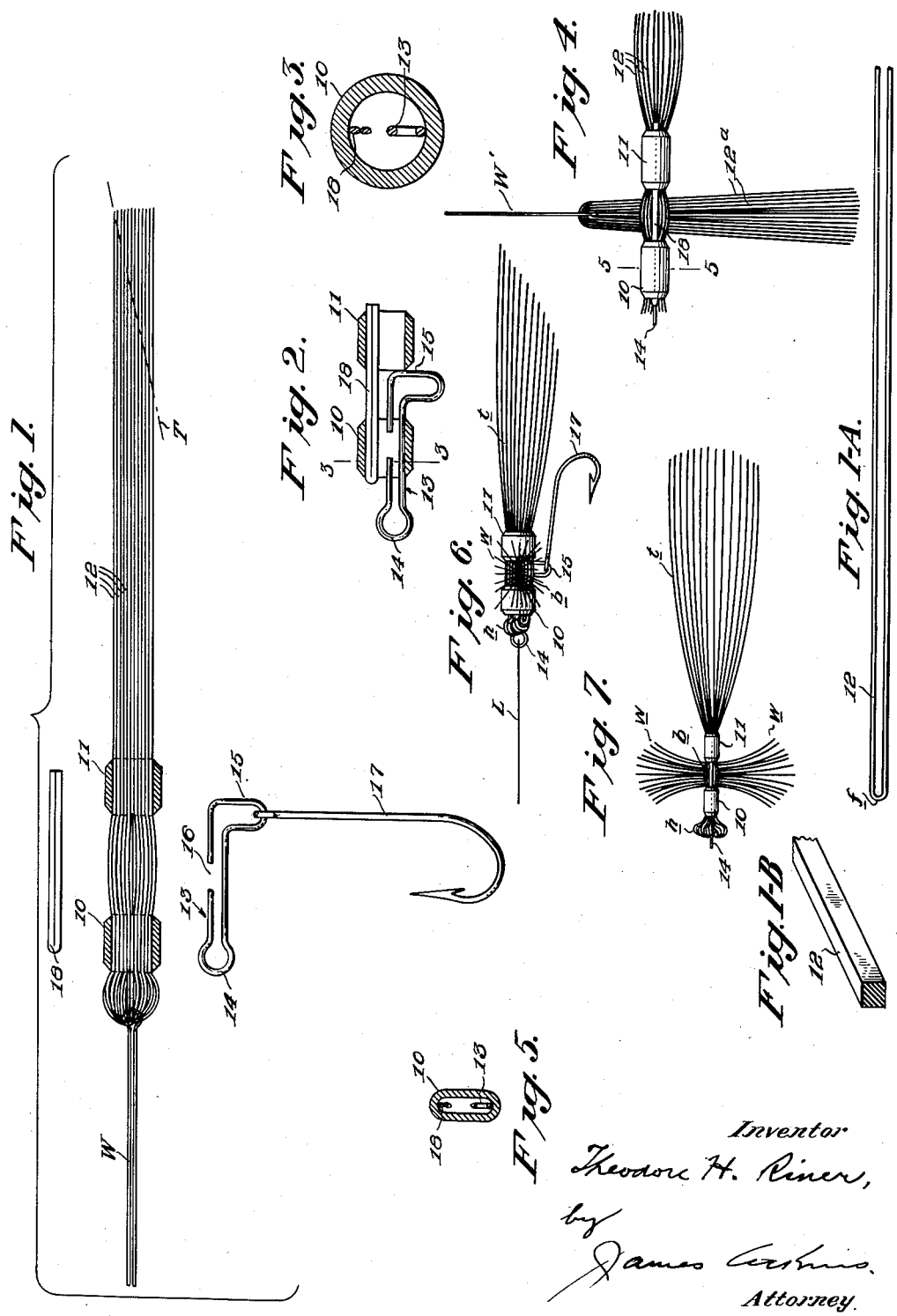
Inventor
Theodore H. Riner,
by
James Cushing
Attorney.

Patented Apr. 22, 1952

2,594,264

UNITED STATES PATENT OFFICE 2,594,264

FISH LURE AND METHOD OF CONSTRUCTING SAME

Theodore H. Riner, Bakersfield, Calif.

Application March 7, 1946, Serial No. 652,703

11 Claims. (Cl. 43—42.24)

1

This invention relates to a fish lure and method of constructing same.

More specifically, the invention is concerned with a fish lure embodying flexible body, head, tail, and wing portions whereby to simulate a live bait in appearance and action.

While fish lures of this general character have heretofore been used or proposed, such have not been constructed in a manner to permanently maintain the several flexible portions in satisfactory conditions of use, in that one or more of such portions, as, for example, the tail portion, sooner or later become fouled through interference with the hook.

A primary object of this invention is the provision of a fish lure comprising highly flexible strand-like head, body, tail, and wing portions which are so constructed and assembled as to maintain their forms and actions when the lure is in use.

A further object of the invention is a novel method of constructing a lure of the character above referred to.

A still further object of the invention is a novel method of tying or binding a bundle of elongated rubber strands of rectangular cross-section intermediate their ends without any twisting action on the strands, whereby they will flare out in substantial symmetrical relation to the axis of the bundle immediately adjacent the ends of tied or bound portions thereof.

A still further and more specific object of the invention is the provision of a fish lure comprising head, body, and tail portions formed from a single bundle of flexible and elastic strands which are held under stress within metallic ferrules disposed between such portions, and the lure further comprising wing portions formed from a bundle of flexible and elastic strands extending through the first strands within the body portion and maintained in operative position through yielding reaction of the strands.

A still further object of the invention is the provision of a fish lure comprising flexible head, body, and tail portions with a pliable member disposed within the body portion, whereby upon bending such member the form of the lure may be changed with a corresponding change in action of the lure when in use.

A still further object of the invention is to provide a method in the construction of fish lures wherein a bundle of elongated elastic strands is bound at one or more points in its length in such manner that the strands are compressed at such points in the absence of any twisting action thereon.

With the above objects in view, together with others that will become apparent in the course of the following disclosure, reference will be had to the accompanying drawing, wherein is illustrated a preferred form of the invention.

In the drawing:

Figure 1 is a view partly in side elevation and partly in section and illustrating individual parts of the lure during and before assembly thereof, the parts being on an enlarged scale.

Fig. 1–A is a view on an enlarged scale of one of the folded flexible and elastic strands as used in the head, body, tail, and wing portions of the lure.

Fig. 1–B is a fragmental perspective view of one of the strands showing the form thereof in cross-section on a substantially enlarged scale.

Fig. 2 is a view in side elevation and longitudinal vertical section showing the assembly of certain metallic elements.

Fig. 3 is a cross sectional view on an enlarged scale as observed in the plane of line 3—3, Fig. 2.

Fig. 4 is a top plan view of the lure during assembly thereof and showing the method of drawing a bundle of elastic strands through the body portion in the formation of the wings.

Fig. 5 is a vertical section as observed in the plane of line 5—5, Fig. 4.

Fig. 6 is a side elevational view of the completed lure.

Fig. 7 is a top plan view of the completed lure.

Referring now in detail to the drawing by use of reference characters, 10 and 11 designate metallic ferrules or bands which may be constructed of aluminum, brass, or copper and which are originally of circular form in transverse section as indicated in Fig. 3.

The head $h$, body $b$, and tail $t$ of the lure are formed from a single bundle of flexible and elastic strands 12 which in the lure of actual size, as in Figs. 6 and 7, are about six inches long, although they are shown about twice this length in the enlarged Fig. 1.

The elastic strands 12 are of uniform rectangular cross-section throughout their lengths.

The strands 12 are first positioned in superposed parallel arrangement to provide a bundle thereof, after which the bundle is folded over intermediate its ends at $f$, as is more clearly indicated in Fig. 1–A. This bundle is next engaged in the fold $f$ thereof by the bight of a looped wire W. The folded bundle is then pulled axially through the ferrule 11 while maintaining the normal lay of the strands is likewise thereafter pulled through the ferrule 10 with the two ferrules spaced as in Fig. 1.

The wire clip 13 is now pushed through the ferrule 10, as indicated in Fig. 2 (the strands being omitted for clarity of disclosure), and the member 18 is positioned within the two ferrules.

The clip 13 embodies an eye 14 for attachment of a line L, a hook suspending loop 15, and a hook admission gap 16.

With the parts as in Fig. 2 and with the ferrules still spaced as in Fig. 1, the ferrule 10 is swaged or flattened as indicated in Fig. 5 (strands omitted for clarity of disclosure), whereby the strands 12 as well as clip 13 and member 18 are firmly gripped to retain same in position. The ferrule 11 is now pushed toward the ferrule 10 until it engages the loop 15 of clip 13 as in Fig. 2, and thereafter the ferrule 11 is swaged as was the ferrule 10. The wire W is withdrawn from the folds in the strands with the lure now embodying a flexible head $h$, body $b$, and tail $t$, with ferrules 10 and 11 separating such portions of the lure, and with a hook 17 suspended from the loop 15 of the clip 13.

A folded over bundle of flexible elastic strands 12a of the same transverse dimensions as strands 12 is now engaged by a wire W' and pulled through the strands 12 in the body portion $b$, as in Fig. 4, in the formation of the wings $w$, and the reaction of the strands 12a upon release of tension therein firmly retains same in position. The strands 12a are trimmed after having been pulled through strands 12 to provide the wings as in Fig. 7, and the strands 12 are preferably trimmed as on line T (Fig. 1) to provide the tapered tail $t$ as in Fig. 6.

By the use of the wire clip 13, prior cork, wood or plastic bodies are eliminated, and by such clip the hook is suspended in a manner so as to avoid fouling of the streamer tail $t$, the ferrule 11 materially aiding in keeping the hook away from the tail, as can be seen from Fig. 6.

By the use of the two ferrules or bands, a flexible body $b$ is provided, and by use of the member 18, which may be a folded wire of soft brass or copper, the body may be deformed by bending the wire whereby to vary the action of the lure, and the more the wire is bent, the more erratic the action of the lure will be.

The elastic strands are preferably rubber strips rectangular in cross section, as indicated in Fig. 1-B, which aids in bringing out the flexing or swimming action when in the water, as does the size, which should not exceed .025 of an inch. This flexing causes the lure to streamline when being cast and makes it possible to cast a large lure with ease. It also causes the lure to fluff up when in the water, thus making it appear much larger for attracting larger fish. There is no resistance to the strike and the whole lure is easily taken into the fish's mouth.

The present lure is not dependent upon bright colors, but efficiently attracts fish through the varied movements of the flexible strands providing the head, body, tail, and wing portions thereof. The strands are indicated in Fig. 1 approximately of actual size in the enlarged view, which is approximately twice the actual size; but in the other figures the strands are indicated by single heavy lines for simplicity of disclosure, and while the different views may indicate a relatively small number of strands, there are, particularly in the head, body, and tail portions, a relatively large bundle which completely fills the ferrules before being swaged. For maximum efficiency of lures of the kind herein disclosed, it is necessary that the strands flare out immediately adjacent the ends of the bands or ferrules in a generally symmetrical relation to the axis of the ferrule. In order to provide for such uniform flare of the strands as, for example, in the tail $t$, it is necessary that the rubber strands which are rectangular in cross-section, be tightly compressed at the tying points without imparting any twisting action thereto. In order to avoid such twisting action, the bands or ferrules 10 and 11 of normally cylindrical form are flattened as in Fig. 5 by pressure exerted in parallel lines which are normal to a plane tangent to the initially cylindrical band or ferrule, whereby any tendency of twisting of the rubber strands is wholly avoided.

While I have disclosed but a single specific embodiment of the invention, such is to be considered as illustrative only, and not restrictive, the scope of the invention being defined in the subjoined claims.

What I claim and desire to secure by U. S. Letters Patent is:

1. A fish lure comprising an elongated bundle of elastic strands doubled on themselves in the provision of a bend at one end thereof, a pair of axially spaced metallic ferrules surrounding the strands adjacent the bend therein, and a metallic clip extending through one of the ferrules and having a line attaching eye at one end thereof extending beyond the bend in the strands and a hook suspending loop at the other end thereof, the loop engaging the other ferrule and depending from the strands, the bend in the strands defining a head portion, the strands between the ferrules defining a flexible relatively short body portion, and the remainder of the strands defining a relatively long tail portion.

2. A fish lure according to claim 1, together with a readily bendable wire member extending through the ferrules for varying the angular relation of said portions.

3. A fish lure according to claim 1, together with a bundle of elastic strands extending transversely through the first bundle of strands in the body portion and defining wing portions on the lure.

4. A fish lure according to claim 1, wherein the tail portion tapers upwardly and outwardly.

5. A method of forming a fish lure having flexible head, body, and tail portions, which comprises drawing a bundle of elastic strands through a pair of axially spaced rigid ferrules in succession, inserting a line attaching and hook supporting clip between said ferrules and into one thereof, swaging said one of the ferrules to bind the strands and clip therein, moving the other ferrule along the strands into contact with said clip, and swaging said other ferrule to bind the strands therein.

6. The method according to claim 5, wherein a bendable member is inserted between and within said ferrules prior to swaging said one of the ferrules.

7. A method of forming a fish lure having relatively short flexible head and body portions, a relatively long flexible tail portion and flexible wing portions, comprising the steps of binding an elongated bundle of elastic strands at two spaced points in the provision of the head, body, and tail portions, inserting a line attaching and hook-supporting clip within said head and body portions, and then drawing an elongated bundle of elastic strands through the strands in the body portion in the provision of the wing portions.

8. A fish lure comprising a bundle of elongated flexible elastic strands, a pair of spaced rigid bands encompassing and compressing the strands therewithin in the provision of head, body, and tail portions, and wing portions formed from a bundle of elongated flexible elastic strands extending transversely through the first bundle of strands in the body portion thereof and retained in position by the reacting pressure of the strands in the body portion thereon.

9. A fish lure comprising a bundle of elongated flexible elastic strands, a pair of spaced rigid bands encompassing and compressing the strands therewithin in the provision of head, body, and tail portions, and a clip extending through one of the bands and provided with a line-attaching eye disposed forwardly of the head portion, and a hook-suspending loop on the clip engaging the other band and disposed between both bands and depending below same.

10. A method in the manufacture of fish lures which comprises positioning rubber strands which are of the same width and rectangular in cross-section in superposed parallel arrangement to provide a bundle of said rubber strands, folding said bundle intermediate its ends, disposing a relatively short cylindrical and deformable element in advance of the fold in said bundle, engaging the fold and drawing a portion of the folded bundle substantially axially through the cylindrical element while maintaining the normal lay of the strands of the bundle in their folded and parallel condition, and then subjecting said element to flattening pressure directed in parallel lines which are normal to a plane tangent to the cylindrical element throughout the major length of the element, whereby the element is flattened and pressure applied uniformly to the bundle of strand portions therewithin.

11. A method in the manufacture of fish lures which comprises positioning rubber strands which are of the same width and rectangular in cross-section in superposed parallel arrangement to provide a bundle of said rubber strands, folding said bundle intermediate its ends, disposing a relatively short cylindrical and deformable element in advance of the fold in said bundle, engaging the fold and drawing a portion of the folded bundle substantially axially through the cylindrical element while maintaining the normal lay of the strands of the bundle in their folded and parallel condition, pushing a hook-attaching wire clip through the cylindrical element, and thereafter subjecting said element to flattening pressure directed in parallel lines which are normal to a plane tangent to said element throughout the major length of said element, whereby the element is flattened and pressure applied uniformly to the bundle of strands and clip therewithin.

THEODORE H. RINER.

REFERENCES CITED

The following references are of record in the file of this patent:

UNITED STATES PATENTS

| Number | Name | Date |
| --- | --- | --- |
| 969,456 | Brantley | Sept. 6, 1910 |
| 1,302,102 | Tuttle | Apr. 29, 1919 |
| 1,686,114 | Walter | Oct. 2, 1928 |
| 2,018,622 | Davenport | Oct. 22, 1935 |
| 2,148,799 | Bilinski | Feb. 28, 1939 |
| 2,161,094 | Saunders | June 6, 1939 |
| 2,187,666 | Schumann | Jan. 16, 1940 |
| 2,276,571 | Grypma | Mar. 17, 1942 |
| 2,278,876 | Hart | Apr. 7, 1942 |
| 2,340,569 | Setnicka | Feb. 1, 1944 |
| 2,387,255 | Godlewski | Oct. 23, 1945 |
| 2,413,344 | Willman | Dec. 31, 1946 |

FOREIGN PATENTS

| Number | Country | Date |
| --- | --- | --- |
| 3,588 | Great Britain | of 1910 |